US012694103B2

(12) United States Patent
Costin et al.

(10) Patent No.: US 12,694,103 B2
(45) Date of Patent: Jul. 28, 2026

(54) MULTI-ACCESS EDGE COMPUTING FOR REMOTE LOCATIONS

(71) Applicant: University of Florida Research Foundation, Inc., Gainesville, FL (US)

(72) Inventors: Aaron Costin, Gainesville, FL (US); Janise McNair, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 26 days.

(21) Appl. No.: 18/742,266

(22) Filed: Jun. 13, 2024

(65) Prior Publication Data

US 2024/0330451 A1     Oct. 3, 2024

Related U.S. Application Data

(63) Continuation of application No. PCT/US2022/081506, filed on Dec. 14, 2022.

(60) Provisional application No. 63/324,863, filed on Mar. 29, 2022, provisional application No. 63/289,895, filed on Dec. 15, 2021.

(51) Int. Cl.
*G06F 21/55*          (2013.01)
(52) U.S. Cl.
CPC ...... *G06F 21/554* (2013.01); *G06F 2221/034* (2013.01)
(58) Field of Classification Search
None
See application file for complete search history.

(56) References Cited

U.S. PATENT DOCUMENTS

| | | | |
|---|---|---|---|
| 10,959,056 B1 * | 3/2021 | Alsahlawi | .............. G06Q 50/08 |
| 2018/0284754 A1 | 10/2018 | Cella et al. | |
| 2021/0144517 A1 | 5/2021 | Guim et al. | |
| 2021/0176601 A1 | 6/2021 | Alsahlawi et al. | |

FOREIGN PATENT DOCUMENTS

WO          2021214602 A1     10/2021

OTHER PUBLICATIONS

International Search Report and Written Opinion mailed on Mar. 9, 2023 for PCT Patent Application No. PCT/US2022/081506.

* cited by examiner

*Primary Examiner* — Syed A Roni
(74) *Attorney, Agent, or Firm* — Thomas Horstemeyer LLP

(57)          ABSTRACT

The present disclosure provide multi-access edge computing systems and methods. One such system comprises a plurality of sensor devices that are configured to collect construction site sensor data and transmit the sensor data to a local computing system that is configured to combine the sensor data with user feedback data and transmit the combined data to an edge computing system. The edge computing system is configured to process the combined data and transmit the combined data to a cloud computing system, where the cloud computing system that is configured to process the transmitted data from the edge computing system. The edge computing system or the cloud computing system is configured to execute a site risk prediction application and predict a hazard within a construction site based on the collected construction site sensor data and generate an output signal to equipment operating at the construction site.

18 Claims, 4 Drawing Sheets

MULTI-ACCESS EDGE COMPUTING FOR REMOTE LOCATIONS

CROSS-REFERENCE TO RELATED APPLICATION

This application is a continuation of and claims priority to International Application No. PCT/US2022/081506, filed Dec. 14, 2022, which claims the benefit of and priority to U.S. provisional application entitled, "Multi-Access Edge Computing for Remote Locations," having Ser. No. 63/289,895, filed Dec. 15, 2021, and U.S. provisional application entitled, "Multi-Access Edge Computing for Remote Locations," having Ser. No. 63/324,863, filed Mar. 29, 2022, which are each entirely incorporated herein by reference.

STATEMENT REGARDING FEDERALLY SPONSORED RESEARCH OR DEVELOPMENT

This invention was made with government support under Grant Number 2004544 awarded by the National Science Foundation. The government has certain rights in the invention.

TECHNICAL FIELD

The present disclosure is generally related to edge computing systems for remote environments and related methods.

BACKGROUND

Technological advancements such as robotics, automation, sensors, as well as the advanced use of wireless laptops, tablets and smart phones, have provided the construction industry with new and improved techniques to increase productivity, quality, and safety on the construction site. Recently, the Internet of Things (IoT) has increased the value and benefits of these technologies by integrating the ability of even more devices to connect and share data over the internet. In order to leverage such systems, it is important to understand the capabilities and constraints of these systems in the construction environment. Connectivity, bandwidth, cybersecurity, and quality of service (QoS) are a few of the many challenges that will be faced with the dynamic and chaotic nature of the construction environment.

SUMMARY

Embodiments of the present disclosure provide multi-access edge computing systems and methods in remote locations. One such system comprises a plurality of sensor devices that are configured to collect construction site sensor data and transmit the sensor data to a local computing system that is configured to combine the sensor data with user feedback data and transmit the combined data to an edge computing system. The edge computing system is configured to process the combined data and transmit the combined data to a cloud computing system, where the cloud computing system that is configured to process the transmitted data from the edge computing system. The edge computing system or the cloud computing system is configured to execute a site risk prediction application and predict a hazard within a construction site based on the collected construction site sensor data and generate an output signal to equipment operating at the construction site.

Also disclosed herein is method comprising obtaining, by a computing device, a plurality of sensing data within a remote location in combination with user feedback data from the remote location; analyzing, by the computing device, at least the plurality of sensing data and user feedback data and generating a control signal for adjusting performance of equipment operating at the remote location; and transmitting, by the computing device, the control signal to the equipment operating at the remote location.

In one or more aspects of such systems and methods, the output signal causes the equipment to discontinue operation; the output signal comprises a safety alert; the cloud computing system is configured to integrate the sensor data and user feedback data with internet-enabled data, wherein the integrated data is analyzed to generate the control signal; the sensor data comprises motion data, proximity data, location data, or thermal data; the internet-enabled data comprises weather data; and/or the remote location comprises a construction site. In one or more aspects, such systems and methods perform integrating the sensing data and user feedback data with internet-enabled data, wherein the integrated data is analyzed to generate the control signal.

Other systems, methods, features, and advantages of the present disclosure will be or become apparent to one with skill in the art upon examination of the following drawings and detailed description. It is intended that all such additional systems, methods, features, and advantages be included within this description and be within the scope of the present disclosure.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
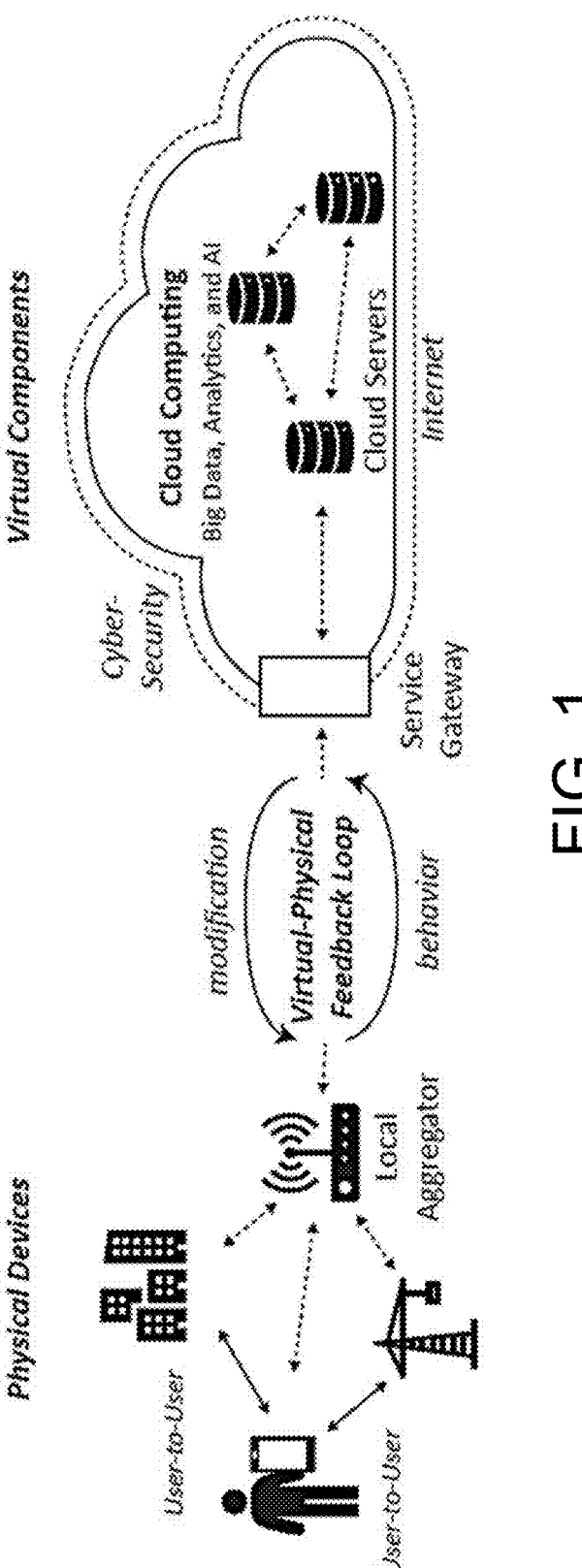
FIG. 1 is system diagram of an Internet of Things environment.

The present disclosure involves the development of a multi-access edge computing systems and methods in remote locations, such as but not limited to construction sites. There has yet to be a comprehensive, IoT (Internet of Things) solution that can incorporate a multitude of heterogeneous solutions in the construction environment. In accordance with various embodiments, an exemplary framework for an edge computing system can incorporate a variety of heterogeneous sensors, technology, software, and artificial intelligence (AI) components. Additionally, in various embodiments, an exemplary construction computing system can provide a distributed Software Defined Networking (SDN)-managed and AI-assisted IoT-based system for real-time safety monitoring based on the IoT system framework. Such systems can be used for safety risk analysis, monitoring robots, heavy equipment, Bluetooth and WiFi communications, work scheduling, and real-time updates on any aspect of a job site for a construction project.

As such, the present disclosure is directed to the use of an edge computing architecture for construction site tracking. The present disclosure features a construction computing system comprising sensors, a local computing system, an edge computing system, and a cloud computing system. Sensors may collect site data and transmit the site data to the local computing system. The local computing system may receive the site data from the sensors, process the site data, and transmit the locally processed data to the edge computing system and receive edge processed or cloud processed data from the edge computing system. Alternatively, the edge computing system may receive the site data directly from the sensors. The edge computing system may comprise edge servers for collecting and compiling data from the local computing systems and/or the site sensors. The cloud computing system may comprise cloud servers for collecting and compiling data from the edge computing systems. Machine learning (ML) models can be implemented on the local, edge, and/or cloud computing systems, such that upstream data can be used in a feedback loop to facilitate learning in upstream models. As an example, cloud computing systems can rely on data provided from edge computing systems which can rely on data provided from local computing systems and/or sensors, where the local computing systems can rely on the site sensor data. As such, the local computing system can transmit site sensor data and/or locally processed data to the edge computing system and the edge computing system can transmit site sensor data, locally processed data, and/or edge processed data to the cloud computing system. In turn, the edge computing system can adjust its models based on instructions provided by the upstream cloud computing system. Likewise, the local computing system can adjust its models based on instructions provided by the edge computing system and/or the cloud computing system. As such, the edge computing system can perform processing at an edge location of a local network at the construction site, acting as an intermediary between local computing systems and a cloud computing system.

Thus, an exemplary system may also involve end-user input and feedback, which is essential for the virtual-physical feedback loop to make appropriate optimized adjustments to the system. Recent innovations such as location-aware computing and machine learning algorithms offer the significant potential of improving and supporting important decision-making tasks. Integration of data from localization system with other internet enabled sources (schedule, weather report, daily progress reports etc.) can provide valuable information about the real-time safety risks accounting for the dynamic hazards in addition to pre-defined ones.

In general, the construction industry's adoption of information and communication technologies (ICT), namely automation, robotics, and building information modeling (BIM), has been slowly, but surely increasing over the past decades. Recently, there has been an increased enthusiasm for the use of digital ecosystems and smart technologies, such as cloud computing and artificial intelligence (AI), as the lower costs, greater availability, and tangible benefits have been a major driving forces in part by the 4th Industrial Revolution (i.e., Industry 4.0). This enthusiasm has led to such a paradigm shift in greater research and adoption, that the industry is witnessing a new era called Construction 4.0 that has a foundation based on Cyber-Physical Systems (CPS), which is the interaction between the physical world and the virtual (cyber). Essentially, CPS involves systems that focus specifically with the physical-virtual data loop. This feedback loop is an important aspect that brings the "smartness" to devices, since Big Data analytics, machine learning (ML), and artificial intelligence (AI) techniques can be utilized to learn user habits.

One major aspect of CPS is the use of physical objects, more aptly "things" that are embedded with sensors, software, and mechanics for the purpose of connecting and exchanging data with other physical objects over the internet. A lot of sensor data is freely available on construction sites that can be used for autonomous safety monitoring without having to put additional resources for data collection. For example, useful visual data that can be collected from moving equipment, stationary site cameras, ground and aerial robots, etc., will result in enhanced semantic understanding of construction site especially from a safety point of view.

These types of devices represent the ability to have a multitude of heterogeneous devices communicate with each without physical connections and can produce real-time data that can be used for analytics and optimization. An exemplary system of the present disclosure utilizes novel optical and sensor designs to allow traditionally expensive visual modalities to be available at low-cost, low-power, and within small form factors and then incorporate them in location verification. Structured light sensors can recover indoor maps through short range measurements, even in visually cluttered and dimly lit scenarios. Thermal sensors have longer range, can detect people and can see through most dust or smoke. Wireless localization can work through all visual haze but struggles in cluttered environments and works best in open spaces.

In various embodiments, sensing data, such as but not limited to particulate density sensor data, radio-frequency identification (RFID) sensor data, proximity sensor data, air quality sensor data, temperature sensor data, and humidity sensor data, can be obtained within a location (e.g., construction site location) and combined with user feedback data from the location. Intelligent computing device on site, at the edge, or in the cloud, can be used to analyze the sensing data and user feedback data and generate a control signal for adjusting performance of equipment operating at the location. For example, a control signal can be transmitted to the equipment operating at the remote location via a local computing system (having a controller application) that is configured to control one or more physical equipment at the location.

TABLE 1

| Application | Data Inputs | Potential Technology |
|---|---|---|
| Equipment Proximity | Proximity (closeness, striking) | RFID, Ultrawide Band, GPS, Two-way hepatic feedback warning alert when thresholds are exceeded |
| Equipment Location | Location | RFID, Ultrawide Band, GPS |
| Worker Speed | Operation of Equipment (Speed) | RFID, Ultrawide Band, GPS, Two-way hepatic feedback warning alert when thresholds are exceeded |
| Worker Movement | Operation of Movement ( vector changes) | RFID, Ultrawide Band, GPS |
| Worker Connection | Connection (seatbelts/harness) | Bluetooth, Smart Watch |
| Anchor tie-off (PFAS) | Connection sensors | Magnetic, Electrical Sensors, Two-way hepatic feedback warning alert when |

TABLE 1-continued

| Application | Data Inputs | Potential Technology |
|---|---|---|
| | | thresholds are exceeded, Report potential slip/trip incident. |
| STF Accelerometer | Accelerometer | Changes in acceleration recorded by accelerometer shows |
| Leading Edge | Proximity Location | RFID, Ultrawide Band, GPS, Two-way hepatic feedback warning alert when thresholds areexceeded |
| STF | Location | RFID, Bluetooth |
| Housekeeping | Imaging | 360 Cameras, UAVs |
| Worker | Temperature, | Wearables technologies |
| Exertion | Heart rate, | Situation awareness monitoring |
| | Psychological | Ultra-band enabled Wet Bulb |
| | status, Ergonomics | enabled temperature meter |

Various construction applications with active leading indicators to prevent safety hazards, the data inputs needed for those applications, and potential technology that can produce the data inputs are identified above in Table 1.

In various embodiments, an exemplary construction computing system includes different sensors and local servers. In an illustrative example, visible hazards, visual data can be captured using pin-hole cameras mounted on eye-tracking glasses of workers, webcams mounted on moving equipment and unmanned ground vehicle (UGV) platform, Zenmuse X5S camera mounted on DJI Inspire 2 UAV, and stationary surveillance cameras, etc. The data acquired can be processed by a local server running on two Nvidia Jetson Tx2 which will use AI to extract semantic information from the live images and detect dynamic hazards. The visual data from moving entities (workers, vehicles, UGV) can also be processed by another local server (running on two Nvidia Jetson TX2) that executes a SLAM algorithm to localize these entities on a global map of the test site. The eye movement data can be collected by using Pupil Lab's core wearable eye-tracking glasses (which can also serve as safety glasses) and be processed by another local server to compute the relevant visual search metrics. This local server can also process other biometric data. For task-based hazards, data can be collected from the schedules, look ahead plans, daily progress reports and processed by a similar local server. Similarly, other sensors can be determined based on functional requirements. The processed data (i.e., the outputs of local servers) can be transferred to a cloud based centralized command center, which performs multiple rule-based analyses, based on received multimodal data, to detect hazards and compute risk levels at different locations in construction site. The safety alerts can then be communicated back to the construction site.

This large network of connected devices is commonly referred to the "Internet of Things" (IoT). Despite the name, the "Internet of Things" is not just a large quantity of things (e.g. devices) connected to the internet. IoT represents the ability to have a multitude of heterogeneous devices communicate with each other without physical connections. These devices, which are equipped with a form of a sensor or actuator, a tiny microprocessor, a communication device, and a power source, have come to be known as "smart objects." The physical devices and technology are a heterogeneous combination of devices, including RFID, wireless, and infrared communication devices, as well as sensors for electrical activity, proximity, motion, particulate density, radio-frequency identification (RFID), air quality, temperature, humidity, etc. These devices represent the ability to have a multitude of heterogeneous devices communicate with each without physical connections and can produce real-time data that can be used for analytics and optimization. A basic abstraction on how the IoT components connect to one another is displayed in FIG. 1, which represents the data flow of smart objects through the IoT framework. The IoT framework is composed of four basic components: smart objects; local aggregators; service gateways; and cloud networks.

Most notably, these systems include objects and sensors that can communicate over local aggregators, such as wireless local area networking (LAN) (e.g. WiFi), Bluetooth, or Long-Term Evolution (LTE) to connect to the internet to achieve various tasks. If a smart object does not have WiFi capabilities, it can connect to a proxy aggregator, such as a smartphone (which is a smart object in itself), which then sends the data through the local aggregator. The aggregator then connects to the internet via a service gateway (e.g. internet provider, cellular service) to connect to cloud servers.

As the IoT devices represent the physical world, the cloud that the data are sent into and processed is known as the virtual world. The virtual components are the cloud servers that host the various algorithms for big data, analytics, and artificial intelligence (AI). The intent is to utilize the IoT physical devices to perform feedback control loops, where the physical devices receive information from an upstream computing system that executes a control application.

Significantly, feedback is needed to adjust functionality based on human behavior and preference. A significant component of this network are the human and social aspects, which are critical for the virtual-physical feedback system to be able to adjust functionality based on human behavior and preference. This feedback loop is used to produce and assess information, such as how the system can adapt to user preferences and behaviors, how human behaviors can be modified to adapt to changing environments, and how the system can be modified to achieve desired results (e.g. maximizing worker safety). Thus, this is a continuous feedback loop that modifies both human behavior and system optimization.

A major barrier commonly faced for construction projects is the low access to high speed internet and computing. Furthermore, end users mostly have limited storage capacities and finite processing capabilities, thus running computing intensive applications, such as BIM, in a resource limited area, such as a contractor trailer at the construction site. This is clearly a major challenge.

To combat this, one effective method is the use of edge computing, which is a new computing method that brings computation and data storage closer to the location where it is needed. Many internet users are familiar with cloud computing, the delivery of computing services-including servers, storage, databases, networking, software, analytics, and intelligence-over the internet ("the cloud"). Cloud computing includes familiar software as a service (SaaS) instances, such as Google Apps, Twitter, Facebook, and Instagram, supported by processing engines like Google File System located deep in the internet architecture.

Figure 2:
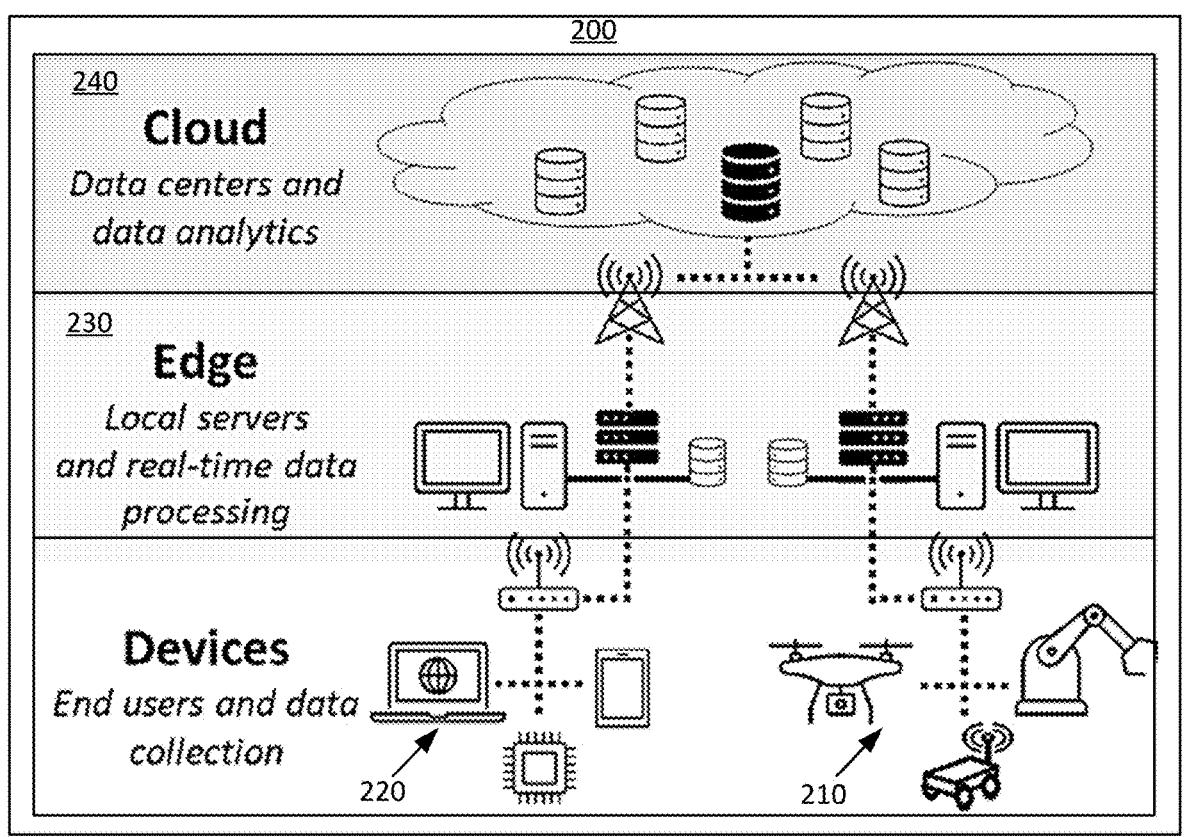
FIGS. 2-3 are a schematic overviews of an exemplary construction computing system in accordance with various embodiments of the present disclosure.

On the other hand, much of the IoT-created data can be stored, processed, analyzed, and acted upon close to, or at the edge of, the network with very short response times for large quantities of private or proprietary data. Cloud computing is not equipped to support these local, busy, private applications. Data is increasingly produced at the edge of the network; therefore, it would be more efficient to also process the data at the edge. FIG. 2 gives a schematic overview an exemplary construction computing system 200 to be used for the construction site.

In some embodiments, the construction system may comprise a plurality of sensors 210 at the construction site and may be disposed at different site locations and/or may be affixed to mobile devices or persons. For example, in various embodiments, many wireless sensors, robots, cameras, proximity sensors, health and security indicators and other devices are deployed and are reporting large amounts of data that should be protected and private, remaining near the construction site. With an edge computing system 230 running a specialized edge operating system (edgeOS) on site, the IoT system can be connected and managed easily and the data can be processed locally to release the delay encountered over the backbone internet infrastructure. Many proposed and present-day construction site solutions utilize web or cloud-based approaches, but new solutions must embrace the more efficient edge computing approach.

In various embodiments, on-demand access points can be established using Bluetooth communications, which can be used in an ad hoc setting; for example, to communicate with smartphone radio devices, and use the signal properties from them to estimate locations. Furthermore, the Bluetooth signals from existing devices in the environment can be activated as additional inputs to the localization, positioning, and mapping system. Bluetooth devices can be effectively used for secure ad hoc inter-device communication. The presence of heterogeneous devices in the environment can be leveraged to provide localization signal data to improve both localization and verification results.

In various embodiments, the construction computing system 200 may further comprise a plurality of local computing systems 220. Each local computing system 220 may be communicatively coupled to one or more site sensors 210 and may comprise a processor capable of executing computer-readable instructions, and a memory component may comprise a plurality of computer-readable instructions.

The construction computing system may further comprise the edge computing system 230 communicatively coupled to the plurality of local computing systems 220 and/or the site sensors 210 and a cloud computing system 240. The edge computing system 230 may comprise a plurality of edge servers for receiving data from local computing system(s) and/or site sensor(s) and receiving processed data or instructions from the cloud computing system. Accordingly, an edge server may comprise a processor capable of executing computer-readable instructions, and a memory component having a plurality of computer-readable instructions.

The construction computing system 200 may further comprise the cloud computing system 240 communicatively coupled to the edge computing system 230. The cloud computing system 240 may comprise a plurality of cloud servers for receiving data from the edge computing system 230. Accordingly, a cloud server may comprise a processor capable of executing computer-readable instructions, and a memory component may comprise a plurality of computer-readable instructions.

The computing systems of the construction computing system 200 can utilize artificial intelligence (AI) to collect and predict unsafe human behavior and unsecure conditions (e.g., site risk predictions), using machine learning techniques and a distributed SDN network management with the development of a physical-virtual feedback loop, specifically relating to human interactions with the technology in order to develop the machine learning and artificial intelligences (AI) algorithms. The AI layer of the IoT system can use the knowledge of already verified data from hybrid multi-sensor technology to learn the normal state of a properly functioning construction site. Localization anomalies introduced into the system can be detected such that a cyber layer can be alerted to identify the type of anomaly, isolate it from the remainder of the system and/or take appropriate action to maintain the security or safety of the site. An exemplary machine learning layer can provide an ensemble CorrDet algorithm, testing both fixed and adaptive thresholds. In an illustrative example, the construction computing system 200 may be configured to track worker positions in real-time and warn them if they are in proximity to a static or dynamic hazard. For example, live video captured using a wearable camera may be used to localize workers on a pre-built global map and deep learning processes may be used to extract semantic information from the environment surrounding the workers. As a result, the system can use this information to detect the proximity of workers to different static and dynamic hazards.

Figure 3:
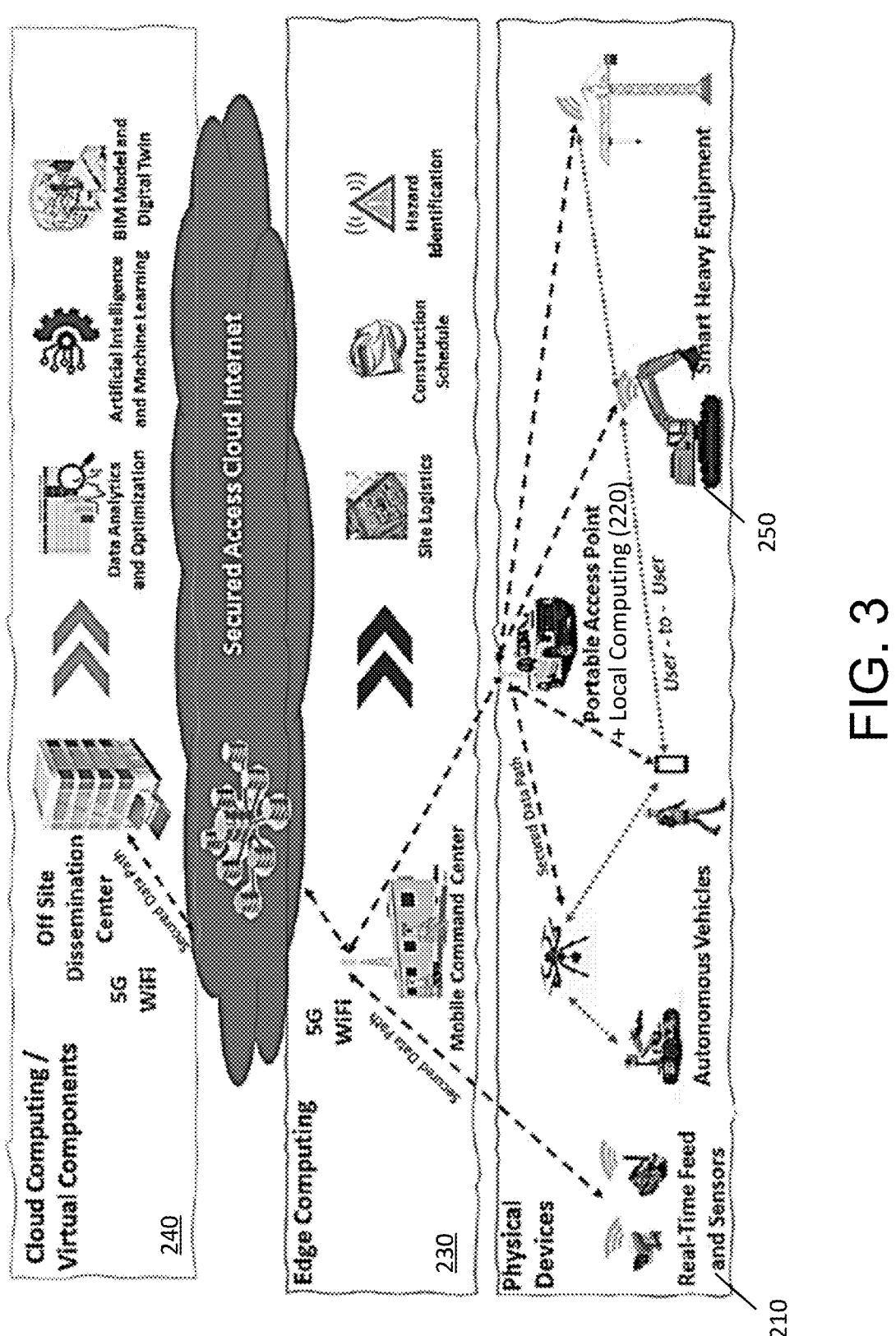

Furthermore, the construction computing system 200 can remotely control robotic autonomous machines such as unmanned aerial vehicles (UAVs), computer numerical control (CNC) machines, 3D printers, etc. Construction is a dynamic environment with new hazards being generated continually based on the current task, relative position of equipment (250), vehicles and workers, current environmental factors etc. Therefore, as represented in FIG. 3, integration of data from localization systems with other internet-enabled sources (schedule, weather report, daily progress reports etc.) can provide additional and valuable information about the real-time safety risks accounting for the dynamic hazards in addition to predefined ones. Since these information streams require robust data transfer packets, having an edge node on site enables the ability to process them. These techniques can be deployed to increase productivity, quality, and safety on the construction job site (FIG. 3). For example, data streams that have been received through IoT devices and sensor networks can be integrated with Building Information Modelling (BIM) tools.

In accordance with embodiments of the present disclosure, the construction computing system 200 can act as a real-time multi-sensor fusion system for real-time hybrid in-door/outdoor localization that can be calibrated reliably, considering the diversity and varying density of the tracked people and equipment in a construction environment. As such, the construction computing system 200 can be configured with various sensor technologies (to produce, collect, and use data) and software (algorithm, analytics) to achieve intelligent safety and secure network managed construction environment for hazard detection and real-time safety risk assessment.

All the connected devices in an exemplary construction computing system produce and transmit an extensive amount of data, requiring the robust collection and analytical mechanisms to process the data. Additionally, with these data being transmitted from the various heterogeneous IoT sources, the ability to interconnect, share, and use the data seamlessly and efficiently, known as interoperability, becomes a major challenge. Interoperability is the ability of systems to mutually operate with each other and make use of data produced by the various systems without effort on the part of the end-user of the systems. IoT systems that exchange information need two things to be fully interoperable: systematic interoperability, which is the ability of heterogeneous systems to connect with each other to enable a data exchange, and semantic interoperability, which is the ability for each system to understand the meaning of the data that is being exchanged. Table 2 (below) shows a sample set of IoT protocols and solutions for the different levels of the IoT platform, and various ones of the protocol are explained below.

TABLE 2

| Function | IoT Protocols |
| --- | --- |
| Networking | 6LowPAN (lightweight IPv6), RPL, LoRaWAN |
| Identification | EPC, uCode, IPv6, URIs |
| Communications | Xbee, Wifi, Bluetooth, LPWAN |
| Discovery | Physical Web, mDNS, DNS-SD |
| Data Protocols | MQTT, CoAP, AMQP, Websocket |
| Device Management | TR-069, OMA-DM |
| Semantic | JSON-LD, Web of Things Model |
| Multi-layer Frameworks | Alljoyn, IoTivity, Weave, Homekit |

IPv6 (Networking): In IoT, Internet Protocol versions 4 and 6 (IPv4 and IPv6) are replaced by IPv6 over Low-power Wireless Personal Area Networks (6LoWPAN), which provides for reduced packet sizes—from multiple tens of thousands of Bytes to less than 200 Bytes—through encapsulation and header compression mechanisms. 6LoWPAN also replaces operation over Ethernet, a high power consumption and large packet network, in favor of the low power IEEE802.15.4/Zigbee/Xbee or IEEE802.11/Wi-Fi based networks.

RPL (Networking): Instead of the complex IP routing protocols to carry information along designated paths from source to one or more destinations, IoT uses the IETF Routing Protocol for Low-Power and Lossy Networks (RPL). RPL is capable of building routes quickly and transmitting routing information among small nodes with minimum overhead. It supports routers, or nodes, that are interconnected by lossy links, typically supporting only low data rates, that are usually unstable with relatively low packet delivery rates. RPL also supports networks of up to thousands of nodes, wherein the traffic patterns are not simply point-to-point, but in many cases point-to-multipoint or multipoint-to-point. Furthermore, such networks may potentially comprise up to thousands of nodes. These characteristics offer unique challenges to a routing solution. RPL objectives include minimizing energy consumption, minimizing latency, or satisfying quality constraints.

LoRaWAN (Networking): Low-Power Wide-Area Networks (LPWANs) are wireless telecommunication networks that are designed to transmit small data packets over long-range distances using the unlicensed spectrum. Correspondingly, Long Range Wide Area Network (LoRaWAN) is a proprietary radio modulation technique based on chirp spread spectrum (CSS) technology that must be used to connect to the LoRaWAN LPWAN network. Demonstrations of LoRaWAN have shown reasonable performance at communication distances up to about 400 miles (600 km) and a single LoRa base station can connect to sensors more than 15-30 miles (22.5-45 km) away in rural areas.

IPv6 (Identification): For unique identification, the Internet Protocol (IP) uses an IP address scheme that identifies the point of attachment to the network using the many possible IP addresses for the devices ($2^{32}$ for IP version 4 and $2^{128}$ for IP version 6). In IoT networks, the IP address may create unnecessary overhead in the data packet. Furthermore, often in IoT networks, a particular device does not have to be contacted, but rather a region of a room, or location of an alarm, or a group of sensors.

EPC (Identification): The Electronic Product Code (EPC) is designed by GS1 EPCglobal as a universally unique product code much like the Universal Product Code (UPC), and the European Article Number (EAN) codes, which are barcode symbols for tracking trade items in stores. The EPC contains an item reference and serial number to recognize each product. It can be used with RFID tags to support supply chain management and users can retrieve information about the corresponding items using the Object Name System (ONS) or other discovery service on the internet.

URI (Identification): A Uniform Resource Identifier (URI) is a compact sequence of characters that identifies an abstract or physical resource. A URI can be further classified as a locator (URL), a name (URN), or both. A more commonly known version of a URI is a Uniform Resource Locator (URL), which in addition to identifying a resource, provides a means of locating the resource by describing its primary access mechanism (e.g., its network "location").

uCode (Identification): A uCode is an identifier to be stored in many types of tags (RFID tags, optical code, infrared markers, and even sound sources), specified by the Ubiquitous ID Center. Its use is to identify objects and places where existing standards do not fit the application needs. Applications that use uCode take advantage of the internet extensively.

Communications: There are several options available for communications over the wireless link for IoT networks, ranging from low power, short range links (Xbee) to very long range wireless links (LoRaWAN). IEEE 802.15 is a working group of the Institute of Electrical and Electronics Engineers (IEEE) "IEEE 802" standards committee which specifies wireless personal area network (WPAN) standards. Two of the standards are regularly employed with IoT networks, IEEE802.15.4 (Zigbee) and IEEE802.15.1 (Bluetooth). IEEE 802.15.4 is the standard for low-rate WPAN communications. The design goal is low power, simple design, low cost, low-to-medium bit rates, and moderate delays without too stringent quality requirements. It only defines the communications, i.e., the Physical layer (PHY) and Medium Access Control Layer (MAC) of the network. The higher-layer Zigbee (Xbee) protocols are left to industry and the individual applications designed by users. IEEE 802.11 is part of the IEEE 802 set of wireless local area network (WLAN) protocols that specifies communications (MAC and PHY) protocols for various frequencies, including but not limited to 2.4 GHZ, 5 GHZ, 6 GHz, and 60 GHz frequency bands. WiFi is the highest power alternative used in IoT networks. It can operate in an ad hoc configuration or with an access point/controller. The individual standards in use now are 802.11a, 802.11b, 802.11g, and 802.11n. The newest standard, 802.11ac, is the newest and fastest standard; it promises to exceed 1 Gbps of throughput. However, WiFi can potentially increase transmission power consumption up to 3 to 6 times that of the 802.15 protocols.

mDNS (Discovery): Multicast Domain Name System (mDNS) is a DNS-like service discovery protocol to resolve host names to IP addresses in a local network without using any unicast DNS server. The protocol operates on IP multicast UDP packets through which a node in the local network enquires the names of all other nodes.

TABLE 2-continued

| Function | IoT Protocols |
| --- | --- |

DNS-SD (Discovery): DNS Service Discovery (DNS-SD) uses standard DNS messages to discover services in an IoT network. Based on mDNS, DNS-SD is used to resolve services available in a network in two steps: (1) in the first step, host names of the service providers are resolved, and (2) in the second step, IP addresses are paired with the host names using mDNS. It is important to identify host names, as IP addresses can change in the network. Like in mDNS, the protocol keeps the host names constant in the network despite the event that devices or nodes have dynamic IP addresses. Since the host name always remains constant in the network, it is possible to identify the devices uniquely and reliably within the local IoT network. Neither mDNS nor DNS-SD require any additional infrastructure (DNS Name Server in the network) or manual configuration or administration of connected IoT devices.

Physical Web (Discovery): Google has developed a discovery protocol called "Physical Web." The Physical Web is an open approach to enable quick and seamless interactions with physical objects and locations. It enables you to see a list of URLs being broadcast by nearby objects.

MQTT (Data Protocols): Message Queuing Telemetry Transport (MQTT) is a many-to-many communication protocol for passing messages between multiple clients through a central broker. It can use the Transmission Control Protocol (TCP) for its transport layer, which is widely characterized as "reliable, ordered and error-checked." MQTT uses a "publish/subscribe" model and requires a central MQTT broker to manage and route messages among an MQTT network's nodes. A central MQTT broker manages and routes messages among an MQTT network's nodes. Others subscribe to messages (content, type, subject). Generally, a broker subscribes to all messages and then manages information flow to nodes.

CoAP (Data Protocols): The Constrained Application Protocol (CoAP) is a specialized web transfer protocol for use with constrained nodes and networks. It enables web services and allows integration to the web and HTTP architectures.

AMQP (Data Protocols): The Advanced Message Queuing Protocol (AMQP) 1.0 is a standardized framing and transfer protocol for asynchronously, securely, and reliably transferring messages between two parties. The technical standardization forum for the AMQP protocol and extension specifications is OASIS, and it has achieved formal approval as an international standard as ISO/IEC 19494:2014. The protocol can be used for symmetric peer-to-peer communication, for interaction with message brokers that support queues andpublish/subscribe entities, as Azure Service Bus does. It can also be used for interaction with messaging infrastructure where the interaction patterns are different from regular queues, as is the case with Azure Event Hubs.

WebSocket (Data Protocols): The WebSocket API is an advanced technology that makes it possible to open a two-way interactive communication session between the user's browser and a server. With this API, you can send messages to a server and receive event-driven responses without having to poll the server for a reply.

IoT system network traffic will come from heterogeneous devices and construction network structures that experience different types of events, requiring more complex networking and control protocols. Managing these evolving networks using traditional network management schemes can increase the cost of network operation and maintenance and leave significant vulnerabilities in fault tolerance and cybersecurity.

Accordingly, Software Defined Networking (SDN) is a networking paradigm in which the forwarding hardware is decoupled from control decisions. The network intelligence is logically centralized in software-based controllers (the control plane), and network devices become simple packet forwarding devices (the data plane) that can be programmed via an open interface. SDNs help to assemble new services and infrastructure quickly to meet dynamically changing environment objectives.

Furthermore, the software implementation of the control plane and the built-in data collection mechanisms are excellent tools to implement machine learning (ML) network control applications. Extracting knowledge from data collection to understand and predict the state of the construction network will be crucial to implementing data and cybersecurity management. Two significant challenges are addressed: real-time SDN machine learning systems, and real-time IoT system management through a distributed SDN (D-SDN) architecture. The challenges of the distributed, real-time approach include coordination between SDN controllers; synchronization, timeliness of responses across the network, which includes latency and jitter in the communication and implementation of the management response; and dynamic failover in the case of failure or compromise of one of the D-SDN controllers. Building a trust relationship between applications and controllers is also an open issue. To address these needs, a distributed, cross-layer controlled SDN with a ML capability for real-time response at local IoT nodes is deployed in various embodiments.

The SDN framework is a viable solution for IoT network management due to its high scalability to improve the reliability of sensing and sharing within wireless sensor networks. To address the network coverage problem of sensor network node transmissions being impacted by node channel disturbances and energy depletion, the sensor network can be divided by clustering the sensor network under virtual switches in order to reduce the regional network load. Accordingly, using multiple switches enables an SDN framework based on multiple controllers within the wireless sensor network (WSN).

Another challenge due to WSN characteristics is the possible disruption and delay in communication, low energy supply and reduced data frame length. A specific solution for such scenario is a software-defined clustered sensor network (SDCSN), where multiple controllers can interconnect SDN domains via border controllers, which may lead to a secure model for WSN ad-hoc networks. Other clustered SDN architectures deploy a distributed security solution where the flow traffic between the sensor nodes can be controlled in a collaborative manner by the SDN cluster head. For mobile sensors, a cloud-based architecture can be used to develop a movement strategy determined by the controller to maintain the barrier coverage for various real environments such as 3D terrain and obstruction, as well as sensing a new environment and reporting it to the cloud. The controller learns the new environment and generates a corresponding new strategy.

Machine learning can be used for a plethora of applications within the SDN controller environment. Traditional supervised machine learning methods generally assume that every possible class and the distribution of possible samples for each of these classes are appropriately characterized by training data. For implementation in a live construction environment however, it is infeasible to assume that all possible behaviors can be identified and characterized in training data prior to implementation of a system. Techniques must take into account the different classes of network traffic created from the diversity of the nodes connected, and the dynamic surrounding environment that provides a multitude of scenarios. Furthermore, malicious attacks and their associated behaviors on the communication infrastructure may need to be re-imagined and implemented to avoid stopping construction activities for each attack. Thus, an exemplary construction system can adapt to changes in communication behavior through application-specific QoS and novel cybersecurity specific SDN controller architectures.

Development of IoT systems potentially integrates broad domains of societal systems, which can be both exposed and vulnerable to new paths for malevolent hacking. A wide variety of threats may occur in an IoT network for the various application within the built environment. For example, public areas are highly susceptible. If access to IoT devices is gained, it can impact the distribution of data throughout the whole network. Encryption techniques can be employed (which are required on secure DOE/government sites), but network fault tolerance and resilience must be maintained in the presence of disastrous situations. In various embodiments, an exemplary construction computing system provides a responsive autonomic data-driven adaptive virtual networking framework (RAVN) to detect and mitigate anomalous network behavior. RAVN integrates the SDN platform, open networking operating system (ONOS); the network performance statistics provided by traffic monitoring tools (such as T-shark orsflow-RT); and the analytics and decision-making tools provided by new and current machine learning techniques to achieve a scheme that detects both low rate and high rate denial of service (DoS) attacks. Methods for monitoring traffic in SDNs have included Deep Packet Inspection, Support Vector Machines, Neural Networks, Hidden Markov Models and Decision Trees. Most supervised machine learning approaches assume that every possible class and the distribution of possible samples for each of these classes are appropriately characterized by training data. An exemplary system adapts to changes in communication behavior, based on cross-feature information and can robustly detect and classify anomalous communication packets in real time. The intra-group variance method works well with any number of selected features from the network traffic meaning it does not require implementing methods such as PCA (Principal Component Analysis) for feature selection. Recent research on application-aware networking focuses on developing methods to detect and classify flows of greedy bandwidth applications for the purpose of QoS management and only hints at how the information can be shared with an SDN for re-configuration. Based on an analysis of gathered network performance statistics, an exemplary system updates new policies to ONOS SDN controller northbound interface for network re-configuration (i.e. flow updates, re-routing, network QoS management, etc.), generates adaptive policies based on results from a clustering and intragroup variance anomaly detection scheme, and utilizes the connection to the ONOS rest API for dynamic mitigation for the anomalous behavior.

In various embodiments, hardware security modules (HSM) can be used to provide an additional layer of security for sensitive data. Accordingly, an HSM (e.g., Zymkey4 HSM by Zimbit) can be deployed (e.g., by an edge server and/or a cloud server) to provide digital signing, encryption, decryption, random number generation, and perimeter detection. Digital Signing adds a unique signature to transmitted data and helps to maintain data authenticity and integrity. Encryption and decryption are processes that secure sensitive information by rendering it inaccessible without authorization. An exemplary HSM is configured to provide the ability to create secure keys that are virtually unbreakable which is called random number generation. Perimeter detection ensures that tampering attempts are detected and prevented. In various embodiments, the integration of a hardware security module can result in significant improvements in network performance and thermal management over software techniques.

Automation and construction will ultimately shape the future of work in construction. Therefore, it is imperative that the current work force adapts and creates a symbiotic relationship with the emerging technology, where the automation and technology could improve productivity while the worker learns the skill sets needed to use and optimize the technology, ultimately ensuring job security. As the many challenges faced by the construction industry continue to grow, technology will play an integral role in supporting the current workforce. The augmentation of technology will continue to educate and inspire the next generation of workers. Technologies can increase worker efficiency and can even preserve jobs by helping companies improve efficiencies, reduce costs, and increase value. As seen in other industries, demand for labor will increase the need for technologies and automation. It is important to not let machines pass up human involvement, but rather take advantage of emergence to enhance the workers, the construction industry, and society as a whole.

Figure 4:
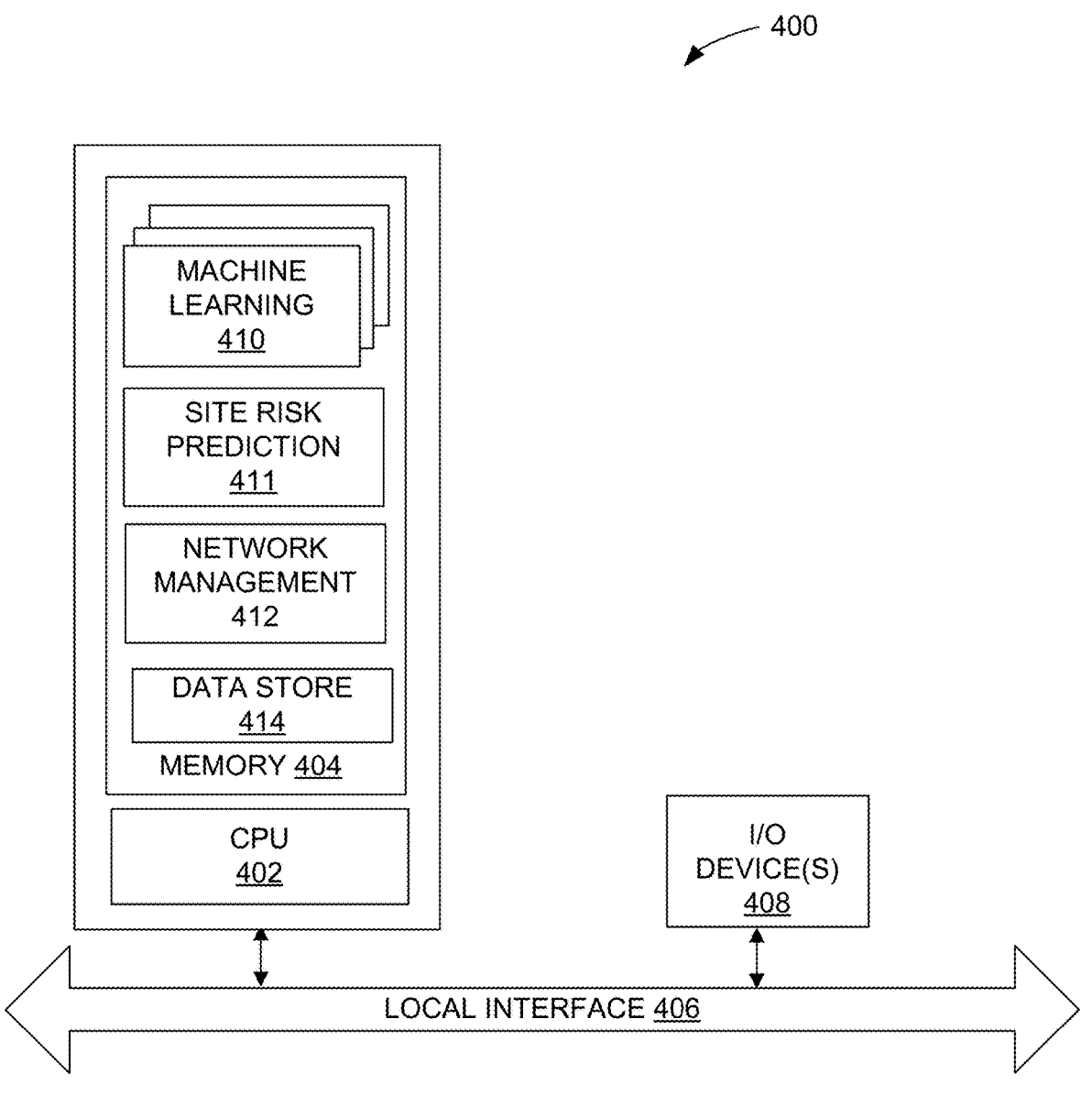
FIG. 4 depicts a schematic block diagram of a computing device that can be used to implement various embodiments of the present disclosure.

FIG. 4 depicts a schematic block diagram of a computing device that can be used to implement various embodiments of the present disclosure, such as, but not limited to, an edge computing system 230. An exemplary computing device 400 includes at least one processor circuit, for example, having a processor (CPU) 402 and a memory 404, both of which are coupled to a local interface 406, and one or more input and output (I/O) devices 408. In various embodiments, additional hardware devices may also be included, such as graphic processing units (GPU), hardware security modules (HSM), etc. The local interface 406 may comprise, for example, a data bus with an accompanying address/control bus or other bus structure as can be appreciated.

Stored in the memory 404 are both data and several components that are executable by the processor 402. In particular, stored in the memory 404 and executable by the processor 402 of computing device 400 and/or across multiple computing devices are machine learning functionality 410, such as in the form of artificial intelligence application (s) or neural model(s), site risk prediction application or module 411, and/or network management application 412 (e.g., SDN), in accordance with embodiments of the present disclosure. Also stored in the memory 404 may a data store 414, and/or other data. In addition, an operating system may be stored in the memory 404 and executable by the processor 402. The I/O devices 408 may include input devices, for example but not limited to, a keyboard, mouse, sensors (e.g., cameras, sensors for detecting proximity, motion, particulate density, RFID, air quality, temperature, and/or humidity, etc.), etc. Furthermore, the I/O devices 408 may also include output devices, for example but not limited to, a printer, display, etc. Also, the I/O devices 408 may include a communication component, such as a network adapter or interface (e.g., WiFi network adapter, Bluetooth adapter, 4G wireless adapter, ethernet adapter, etc.), that allows for wired or wireless communications with external devices and networks.

Certain embodiments of the present disclosure can be implemented in hardware, software, firmware, or a combination thereof. If implemented in software, logic or functionality for a construction computing system, such as site risk prediction, are implemented in software or firmware that is stored in a computer-readable medium (e.g., memory) and that is executed by a suitable instruction execution system. If implemented in hardware, logic or functionality for the construction computing system, such as site risk prediction, and related components can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array (s) (PGA), a field programmable gate array (FPGA), etc.

In the context of this document, a "computer-readable medium" can be any means that can contain, store, communicate, or transport the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: an electrical connection (electronic) having one or more wires, a portable computer diskette or drive (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical).

It should be emphasized that the above-described embodiments of the present disclosure are merely possible examples of implementations, merely set forth for a clear understanding of the principles of the disclosure. Many variations and modifications may be made to the above-described embodiment(s) without departing substantially from the principles of the present disclosure. All such modifications and variations are intended to be included herein within the scope of this disclosure.

The invention claimed is:

1. A system comprising:
a plurality of sensor devices that are configured to collect construction site sensor data and transmit the sensor data to a local computing system;
the local computing system that is configured to combine the sensor data with user feedback data and transmit the combined data to an edge computing system;
the edge computing system that is configured to process the combined data and transmit the combined data to a cloud computing system; and
the cloud computing system that is configured to process the transmitted data from the edge computing system,
wherein the edge computing system and the cloud computing system are configured to execute a site risk prediction application, using machine learning models, and predict a hazard within a construction site based on the collected construction site sensor data and generate an output signal to equipment operating at the construction site,
wherein the cloud computing system is configured to provide instructions to the edge computing system to adjust its machine learning model based on the user feedback data.

2. The system of claim 1, wherein the output signal causes the equipment to discontinue operation.

3. The system of claim 1, wherein the output signal comprises a safety alert.

4. The system of claim 1, wherein the cloud computing system is configured to integrate the sensor data and user feedback data with internet-enabled data, wherein the integrated data is analyzed to generate the control signal.

5. The system of claim 1, wherein the sensor data comprises motion data, proximity data, location data, thermal data, air quality data, humidity data, or Radio Frequency Identification (RFID) data.

6. The system of claim 1, wherein the user feedback data comprises video captured from a wearable camera.

7. A method comprising:
obtaining, by an edge computing device, a plurality of sensing data within a remote location in combination with user feedback data from the remote location;
analyzing, by the edge computing device using a machine learning model, at least the plurality of sensing data and user feedback data and generating a control signal for adjusting performance of equipment operating at the remote location;
transmitting, by the edge computing device, the control signal to the equipment operating at the remote location;
transmitting, by the edge computing device, the plurality of sensing data and the user feedback data to a cloud computing system;
receiving, by the edge computing device from the cloud computing system, instructions to the edge computing system to adjust its machine learning model based on the user feedback data transmitted from the edge computing device; and adjusting, by the edge computing device, the machine learning model based on the instructions from the cloud computing system.

8. The method of claim 7, wherein the sensing data comprises motion data, proximity data, location data, or thermal data.

9. The method of claim 7, further comprising integrating the sensing data and user feedback data with internet-enabled data, wherein the integrated data is analyzed to generate the control signal.

10. The method of claim 9, wherein the internet-enabled data comprises weather data.

11. The method of claim 7, wherein the remote location comprises a construction site.

12. The method of claim 7, wherein the user feedback data comprises video captured from a wearable camera.

13. A non-transitory computer-readable medium having instructions stored therein, wherein the instructions, when executed by a processor, cause the processor to:

obtain a plurality of sensing data within a remote location in combination with user feedback data from the remote location;

analyze, using a machine learning model, at least the plurality of sensing data and user feedback data and generating a control signal for adjusting performance of equipment operating at the remote location;

transmit the control signal to the equipment operating at the remote location;

transmit the plurality of sensing data and the user feedback data to a cloud computing system;

receive, from the cloud computing system, instructions to a edge computing system to adjust its machine learning model based on the user feedback data transmitted from the edge computing system; and adjust the machine learning model based on the instructions from the cloud computing system.

14. The non-transitory computer-readable medium of claim 13, wherein the sensing data comprises motion data, proximity data, location data, or thermal data.

15. The non-transitory computer-readable medium of claim 13, wherein the instructions further cause the processor to integrate the sensing data and user feedback data with internet-enabled data, wherein the integrated data is analyzed to generate the control signal.

16. The non-transitory computer-readable medium claim 15, wherein the internet-enabled data comprises weather data.

17. The non-transitory computer-readable medium of claim 13, wherein the remote location comprises a construction site.

18. The non-transitory computer-readable medium of claim 13, wherein the user feedback data comprises video captured from a wearable camera.

\* \* \* \* \*